(12) United States Patent
Thomsen

(10) Patent No.: US 10,147,064 B2
(45) Date of Patent: Dec. 4, 2018

(54) CONVEYOR VISUALIZATION SYSTEM AND METHOD

(71) Applicant: Rockwell Automation Technologies, Inc., Mayfield Heights, OH (US)

(72) Inventor: Joachim Thomsen, Singapore (SG)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 90 days.

(21) Appl. No.: 14/099,109

(22) Filed: Dec. 6, 2013

(65) Prior Publication Data

US 2014/0229226 A1 Aug. 14, 2014

Related U.S. Application Data

(60) Provisional application No. 61/762,398, filed on Feb. 8, 2013.

(51) Int. Cl.
  *G06Q 10/06* (2012.01)

(52) U.S. Cl.
  CPC ......... *G06Q 10/0633* (2013.01); *G05B 2219/32357* (2013.01); *G06Q 10/06393* (2013.01)

(58) Field of Classification Search
  CPC ......... G06Q 30/0201; G06Q 10/0633; G06Q 10/067; G06Q 10/06316; G06Q 10/06313; G06Q 10/06315; G06F 17/5009; G05B 2219/32357
  See application file for complete search history.

(56) References Cited

U.S. PATENT DOCUMENTS

| | | | | |
|---|---|---|---|---|
| 2,677,453 A | * | 5/1954 | Madeira | B65G 21/14 198/525 |
| 3,754,126 A | * | 8/1973 | Williams, Jr. | G01G 11/18 177/16 |
| 4,744,306 A | * | 5/1988 | Kunczynski | B61B 12/105 104/168 |
| 4,841,693 A | * | 6/1989 | Welsh | F26B 9/02 34/174 |
| 5,237,497 A | * | 8/1993 | Sitarski | G06Q 10/06 705/7.26 |

(Continued)

OTHER PUBLICATIONS

Non-Patent Literature Search for U.S. Appl. No. 14/099,109.*

*Primary Examiner* — Richard N Scheunemann
*Assistant Examiner* — Tyler W Knox
(74) *Attorney, Agent, or Firm* — Fletcher Yoder, P.C.

(57) ABSTRACT

Certain embodiments of the present invention provide techniques for representing components of an industrial system with a visualization tool, in accordance with a physical layout of the industrial system. Other embodiments of the present invention provide techniques for simulating the representations of the components of the industrial system with a simulation engine. In particular, in such embodiments, the utilization of these representations is optimized through an operator interface, and graphical indicia of the utilization are displayed. In addition, the graphical indicia may further comprise a representation of the normalized utilization for each representation. In yet other embodiments, the present invention provides techniques for auto-calibrating the representations of the components of the industrial system based on information received during operation of the industrial system.

23 Claims, 9 Drawing Sheets

(56) References Cited

U.S. PATENT DOCUMENTS

| | | | |
|---|---|---|---|
| 5,423,417 A * | 6/1995 | Redekop | B27B 31/00 198/774.1 |
| 5,626,101 A * | 5/1997 | Kuhl | A01K 45/005 119/845 |
| 7,359,870 B1 | 4/2008 | Hadfield et al. | |
| 8,186,499 B2 | 5/2012 | Brandt et al. | |
| 8,290,630 B2 | 10/2012 | Lakomiak et al. | |
| 2007/0132779 A1* | 6/2007 | Gilbert et al. | 345/619 |
| 2008/0228453 A1* | 9/2008 | Klein | 703/6 |
| 2009/0265157 A1* | 10/2009 | Piepenbrock et al. | 703/21 |
| 2009/0287330 A1* | 11/2009 | Overley et al. | 700/96 |
| 2010/0082129 A1* | 4/2010 | McGreevy | G06Q 10/06 700/80 |
| 2010/0299169 A1* | 11/2010 | Schlereth | G05B 19/41865 705/7.23 |
| 2011/0295563 A1* | 12/2011 | McDaniel | G06F 17/5009 703/1 |
| 2012/0029661 A1* | 2/2012 | Jones | G05B 19/0426 700/17 |

* cited by examiner

CONVEYOR VISUALIZATION SYSTEM AND METHOD

CROSS REFERENCE TO RELATED APPLICATIONS

This application is a Non-Provisional of U.S. Provisional Patent Application No. 61/762,398, entitled "Conveyor Visualization System and Method," filed Feb. 8, 2013, which is herein incorporated by reference.

BACKGROUND

The invention relates generally to the field of conveyors for industrial systems. More particularly, embodiments of the present disclosure relate to a system and method for visualizing and simulating the components of an industrial conveyor system to optimize utilization.

For an industrial system with many components, it is beneficial to optimize the performance of each component so that the industrial system as a whole operates efficiently. For example, in systems employing conveyors, such as high-speed packaging line, the system relies on the efficient interplay between machine components and a series of conveyor sections between the machine components. The conveyor sections in such systems have a plethora of functions, such as transporting goods between machine components, positioning goods for machine processing, or acting as buffers to bridge time. As such, it is often beneficial to visualize and simulate the interplay between the conveyor sections and the machines of an industrial system, so that the performance of these components (e.g., speed, quantity, position, or size of conveyor sections) may be optimized.

However, traditional visualization and simulation tools use modeling schemes that are complex to manage and that are limited in the information they provide. Indeed, such tools use modeling schemes that often bear little resemblance to the physical implementation of the industrial system. As such, there is a need for a simpler and more scalable visualization and simulation tool to visualize and simulate the components of an industrial system.

BRIEF DESCRIPTION

Certain embodiments of the present invention provide techniques for representing components of an industrial system employing conveyors with a visualization tool, in accordance with a physical layout of the industrial system. In particular, such embodiments provide a visualization tool that may represent the machine components of the industrial system and at least one conveyor section positioned between the machine components. Other embodiments of the present invention provide techniques for simulating the representations of the components of the industrial system with a simulation engine. In particular, in such embodiments, the utilization of these representations is optimized through an operator interface, and graphical indicia of the utilization are displayed. In addition, the graphical indicia may further comprise a representation of the normalized utilization for each representation. In yet other embodiments, the present invention provides techniques for auto-calibrating the representations of the components of the industrial system based on information received by the simulation engine during operation of the industrial system or based on information received by the system itself. More particularly, sensor information received during operation of the industrial system or during operation of the simulation may be used to adjust the graphical indicia of the system utilization.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
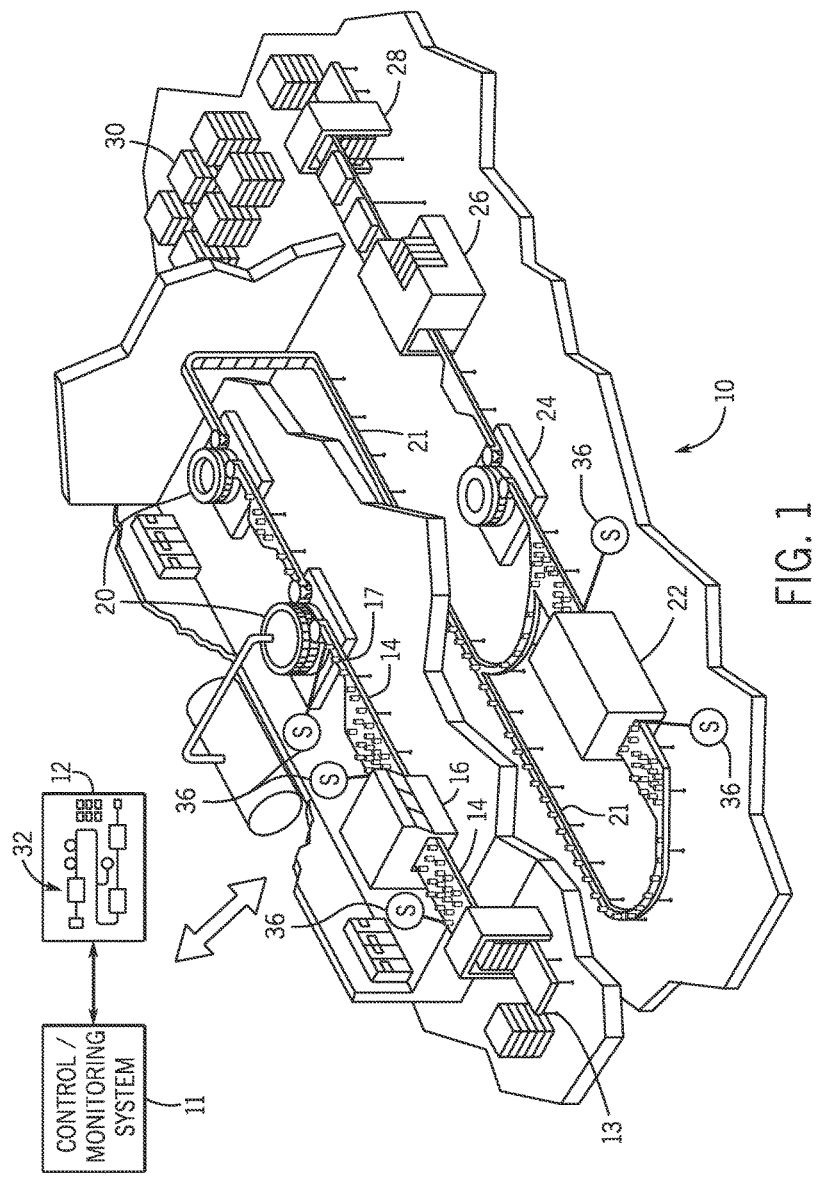
FIG. 1 illustrates an exemplary embodiment of an industrial system, a control/monitoring system, and a display/operator interface.

FIG. 1 illustrates an exemplary embodiment of an industrial system 10 that includes a control/monitoring system 11, and a display/operator interface 12. The industrial system 10 may be any system in the material handling, packaging industries, manufacturing, processing, or any technical field that employs the use of one or more conveyor sections. As illustrated, the industrial system 10 is a high speed packaging line in the food and beverage industry configured to process beverage containers (i.e., a beverage line). The system 10 may include machine components that, for example, fill, label, package, or palletize containers. The system 10 may also include one or more conveyor sections that, for example, transport, align, or buffer containers between the machine components. Here again, however, it should be borne in mind that any suitable application may make use of the programming and visualization techniques described in the present disclosure.

As illustrated in FIG. 1, the system 10 may include machine components configured to conduct a particular function within the beverage packaging process. For example, the beverage packaging process begins at a loading station 13, where pallets of empty cans or bottles needed to be filled are fed into the system 10 via a conveyor section 14. The conveyor section 14 transports the empty cans from the loading station 13 to a washing station 16, where the empty cans and bottles are washed and prepared for filling. As the washed cans and bottles exit the washing station 16, a conveyor section 14 may gradually transition into an aligning conveyor section 17, such that the washed cans and bottles enter a filling and sealing station 20 in a single-file line. The filling and sealing station 20 may function at an optimal rate when the washed cans and bottles enter the filling and sealing station 20 in a steady, uniform stream. However, if the transition between the conveyor section 14 and the aligning conveyor section 17 is erratic or faster than desired, the filling and sealing station 20 may not function at an optimal rate. As such, optimizing performance parameters (e.g., speed, size, function, position/arrangement or quantity) of the conveyor sections (i.e., conveyor section 14 or aligning conveyor section 17) may be beneficial to the efficiency of the industrial system 10.

As the sealed cans exit the filling and sealing station 20, a buffering conveyor section 21 may delay allowing the sealed cans to enter the next station. In addition, the buffering conveyor section 21 may transport the sealed cans in a single-file line so that the sealed cans arrive at the sterilization station 22 or a labeling station 24 at a desired time with the desired quantity of cans. Similar to the filling and sealing station 20, the packaging station 22 or the labeling station 24 functions efficiently when the buffering conveyor section 21 operates at optimal performance parameters (e.g., optimal speed, size, function, position/arrangement or quantity). After the cans and bottles have been sterilized and/or labeled, they are packaged into cases (e.g., 6-pack, 24-pack, etc.) at a packaging station 26, before they are palletized for transport at station 28 or stored in a warehouse 30. Clearly, for other applications, the particular system components, the conveyors and their function will be different and specially adapted to the application.

In particular, the industrial system 10 may also include a control/monitoring system 11 coupled to a display/operator interface 12, and one or more sensors 36. In certain applications, more than one, and sometimes many such control/monitoring systems and interfaces may be provided, and these may be interconnected for coordinated control, reporting, and so forth. In certain embodiments, as described below, the control/monitoring system 11 is configured to represent components of the system 10, such as machine components (i.e., stations 13, 16, 20, 22, 24, 26 and 28) or conveyor sections (i.e., sections 14, 17, and 21), via programming objects that may be instantiated and executed to provide simulated functionality similar or identical to the actual components, as well as visualizations of the components, or both. The objects comprise code that is stored in the system and executed by processing circuitry that forms part of the control/monitoring system 11. As illustrated, the display/operator interface 12 depicts representations 32 of the components of the system 10. The processing circuitry is associated with memory circuitry that allows for the storage of the component visualization/simulation related objects (further described below). Similar objects are stored and executed to simulate, control and/or monitor the conveyor sections. When executed, the visualization/simulation objects may display on the display/operator interface 12 representations 32 of the components and conveyor sections of the industrial system 10, in accordance with the physical layout of the components. Furthermore, the visualization/simulation objects may simulate the operation of the representations 32 of the components, and may allow an operator to optimize the utilization of the represented system through the display/operator interface 12. This may be done both in a simulation or design phase (that is, prior to sale, assembly, programming, and commissioning of the equipment) and during operation of the equipment (that is, following programming and commissioning). In addition, the visualization/simulation software may auto-calibrate or adjust the representations 32 of the components based on information measured by one or more sensors 36 during operation of the industrial system. In such embodiments, the auto-calibration may serve to automatically optimize the utilization of the represented components, and is particularly suited to ensuring that the visualization provided matches the actual operation, loading, speeds, and general utilization of the conveyor systems.

The sensors 36 may be located in various positions within the system 10, and may measure a parameter value of interest relating to the beverage packaging process during the operation of system 10. For example, in certain embodiments, the sensors 36 may include sensors configured to measure the rate of bottles or containers per minute (BPM) entering or leaving a machine component (i.e., stations 13, 16, 20, 22, 24, 26 or 28), or the rate of accumulation of bottles on a portion of a conveyor section (e.g., conveyor section 14, 17, or 21). In general, any sensors 36 capable of measuring a parameter value of interest relating to the beverage packaging process of system 10 (e.g., rate, pressure, speed, accumulation, density, distance, position/arrangement, quantity, size, and so forth) may be used. In some embodiments, signals relating to the measured parameter values may be transmitted to the control/monitoring system 11, and may be converted into a format (i.e., graphical or numerical) suitable for display on a display/operator interface 12. In other embodiments, the signals relating to the measured parameter values may be used by the visualization/simulation objects (further described below) to auto-calibrate the representations of the components and equipment utilization during the operation of the system 10. In such embodiments, the sensors 36 may be used to optimize and correct the utilization and the representation of utilization of the represented components, such as, for example, the representation of the conveyor section 14 on the display/operator interface 12. Of course, the type and functionality of the particular sensors may vary depending upon the particular application, the articles being made or handled, and so forth.

Figure 2:
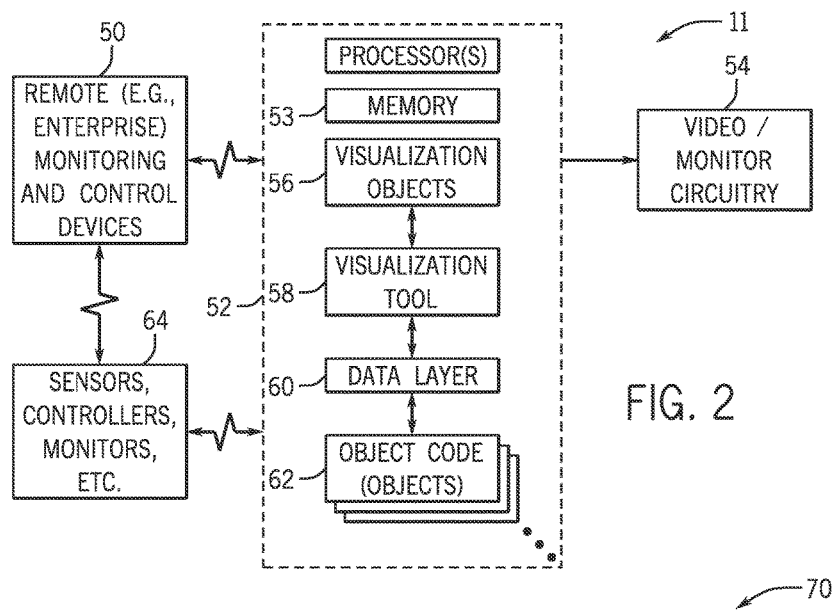
FIG. 2 illustrates an exemplary embodiment of the control/monitoring system of the industrial system.

FIG. 2 is a block diagram illustrating an exemplary embodiment of the control/monitoring system 11 of the industrial system 10. The control/monitoring system 11 may have one or more processors 52, one or more remote (e.g., enterprise) monitoring and control devices 50, and video/monitor circuitry 54. The control/monitoring system 11, as also described in FIG. 1, is configured to represent components of the system 10, such as machine components (i.e., stations 13, 16, 20, 22, 24, 26 and 28) and conveyor sections (i.e., sections 14, 17, and 21), on the video/monitor circuitry 54. In certain embodiments, the video/monitor circuitry 54 may be the display/operator interface 12, or may be connected to the display/operator interface 12, as described in FIG. 1. In other embodiments, the video/monitor circuitry 54 may be other forms of display, such as a panel, personal computer monitor, a mobile device (e.g., smartphone, handheld computer, tablet computer, etc.), and so forth.

The control/monitoring system 11 further includes remote monitoring and control devices 50 adapted to interact with the system 10, and to transfer information from the system 10 to one or more processors 52. The monitoring and control devices 50 may be a remote computer, automation controller (e.g., programmable logic controller (PLC)), or any other type of controller device. In some embodiments, the remote monitoring and control devices 50 may be connected to network components or equipment within the system 10. For example, the monitoring and control devices 50 may be in communication with the sensors, controllers, and monitors 64 (e.g., the sensors 36) within the system 10, and may receive information about the system 10 while it is in operation. In other embodiments, the sensors, controller, and monitors 64 may be in direct communication with the processor 52, and may provide the processor 52 with information relating to the system 10 while it is in operation. Information provided by the remote monitoring and control devices 50 and information gathered by the sensors, controller, and monitors 64 may be used by the processor 52 to build representations 32 of the system components and to determine utilization of these representations 32.

In particular, the one or more processors 52 may be adapted to function as a visualization/simulation tool, which may represent components of the industrial system 10 (e.g., conveyor section 14) in accordance with the physical layout of the industrial system 10. Indeed, as briefly describe above, the visualization/simulation tool may also simulate the operation of the represented components and allow an operator to optimize the utilization of the represented components. In such embodiments, the operator may adjust data parameters of each represented component in order to determine the set of data parameters that provides the optimal utility. Furthermore, the visualization/simulation tool may also auto-calibrate and optimize utilization of the represented components based on information received from sensors, controller, monitors 64 (e.g., the sensors 36) while the system 10 is in operation.

While the processor 52 may comprise many different parts and components, certain exemplary components are presently illustrated to demonstrate aspects in accordance with embodiments of the present techniques. Specifically, the illustrated embodiment of the processor 52 includes a memory 53, visualization objects 56, a visualization tool 58, a data layer 60, and object code 62. The object code 62 may be written in one or more object oriented languages, or in any suitable computer language, and, when instantiated and executed, provide instructions for a sequence of operations (e.g., simulation, control, monitoring, visualization, etc.). The code may be stored in an object file format. The execution of the object code 62 by the processor 52 generates an object (i.e., a location in a memory 53 having a value and referenced by an identifier), such that the object is representative of a machine or conveyor component within the system 10. For example, execution of the object code 62 by the processor 52 may generate a location in memory 53 that is representative of the conveyor section 14, a washing station 16, or other components of the system 10.

The object generated by the object code 62 may be uniquely characterized with data parameters by the data layer 60. The data parameters may be different parameters that may affect the function of components within the system 10. More specifically, the data parameter may be a performance parameter (i.e., a parameter that influences the performance or efficient function of a system component) such as speed, dimensions, function, position/arrangement, quantity, and so forth. For example, the object generated to represent the conveyor section 14 may be uniquely characterized as having a particular width and length. The data parameter may also be a parameter value of interest measured by the sensors 26, such as, for example, rate, pressure, speed, accumulation, density, distance, position/arrangement, quantity, size, and so forth. In such embodiments, the data parameters are set, and/or later automatically modified/updated, with information received from the sensors, controllers, monitors 64 (e.g., the sensors 36). Similarly, in other embodiments, the data parameters are set, and/or later automatically modified/updated, with information received from the remote (e.g., enterprise) monitoring and control devices 50. Indeed, the data parameters used by the data layer 60 to characterize the object generated may be any parameter that may uniquely characterize the object. In certain embodiments, the data parameters are particularly chosen so that the iterative manipulation of the data parameters by an operator may yield a set of data parameters which correspond to optimal utility for one or more system components. For example, during a simulation or design phase, the components, including the conveyors may be changed, re-arranged, enlarged, reduced, sped or slowed, and so forth until a better or best solution is found, and this solution, including supporting configuration data, may be saved for later use in ordering, assembling, installing, programming, and commissioning of the actual system components. This use of the objects, programming, and visualization both for design and simulation, and for later commissioning may greatly facilitate the both the initial design and the later building and programming of the actual system.

Figure 4:
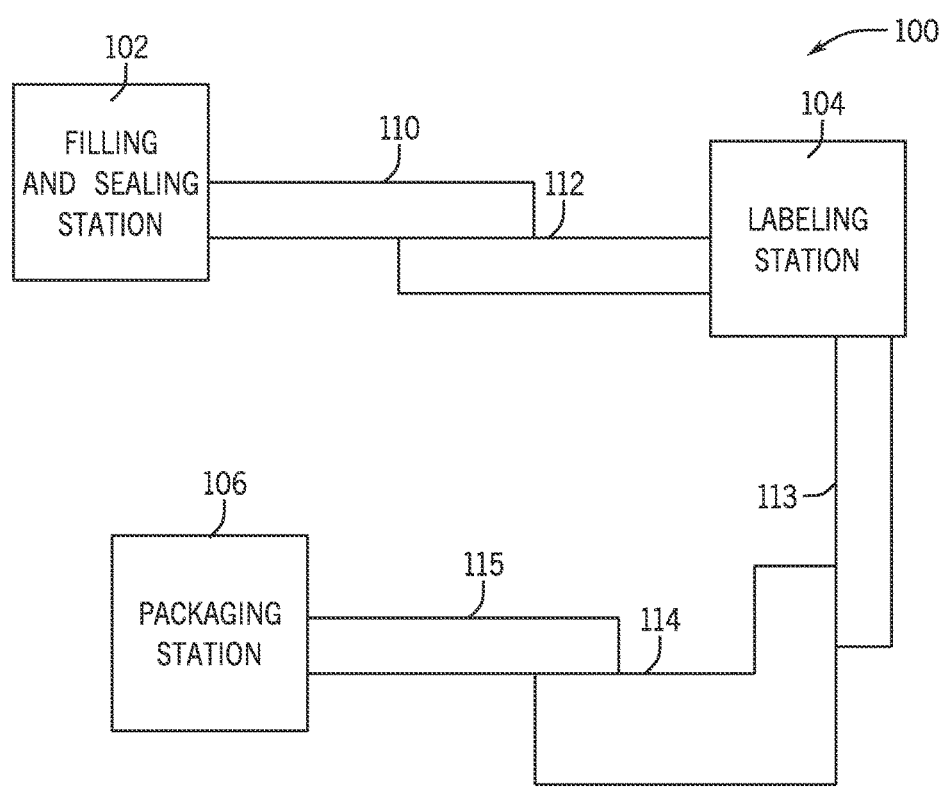
FIG. 4 is a visualization depicting a simple layout generated by the visualization tool to represent the components of the industrial system in accordance with an embodiment.
Figure 5:
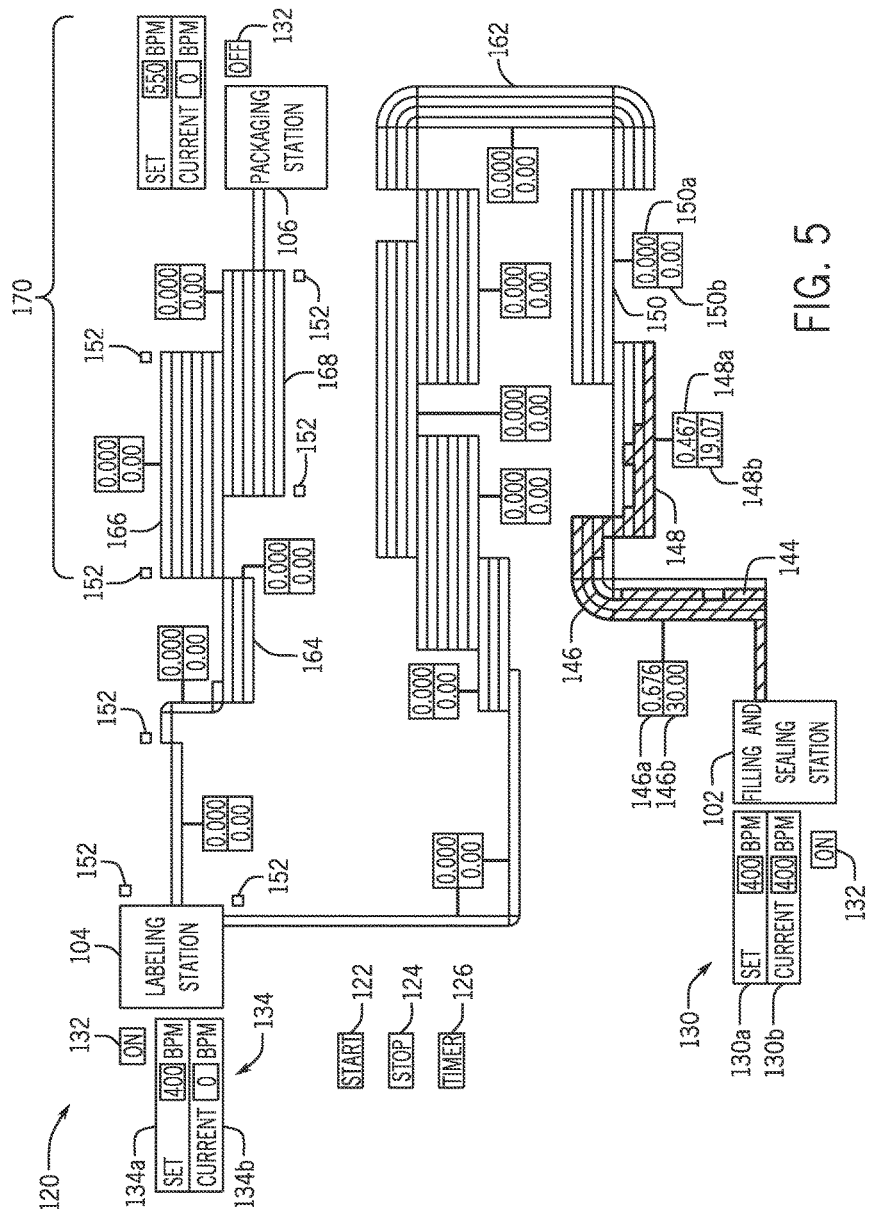
FIG. 5 is a visualization depicting a detailed layout generated to represent the simulated operation of components of the industrial system in accordance with an embodiment.

Once the objects generated by the object code 62 are uniquely characterized by the data layer 60, a visualization tool 58 may build a layout (i.e., platform or design environment) depicting the visualization objects 56 (further described FIG. 4-5). In certain embodiments, the visualization objects 56 may be any geometric shape (i.e., circle, square, rectangle, hexagon, and so forth) used to visually represent the system component (i.e., object generated by object code 62), as well as any labeling, indicia, coloration, and so forth that may assist in understanding the components and their operation, both during simulation and actual use. For example, the washing station 16 may be represented by a square labeled "washing station" in the visualization tool 58 layout, while the conveyor section 14 may be represented by a rectangle within the visualization tool 58. The layout of the visualization tool 58 platform may be free form, and may allow an operator to easily move and position the visualization objects 56 in an appropriate arrangement. As such, the physical layout of the industrial system 10 may be visually depicted with visualization objects 56 on a visualization tool 58 platform. In some implementations, it may be useful to define a library or standard set of objects and visualizations that can be re-used, and adapted for specific locations, sizes, speeds, and so forth. During simulation, the data layer may provide information that is used for altering the visualization (e.g., labels, utilization indicia, coloring, etc.), while during actual use, the data may reflect the actual performance of the components.

While in a presently contemplated embodiment separate operational and visualization objects are used, with the data layer serving to inform the visualization objects of parameters that are used in the visualization or representation of the system components, it is also contemplated that these objects may be unified. That is, objects may be adapted for specifically configured components, conveyors and the like that allow for both simulation (and/or control and monitoring) of the components and conveyors and that include visualization properties and methods that allow for directly contributing to a user viewable screen for visualization, again both during simulation and actual use.

Figure 3:
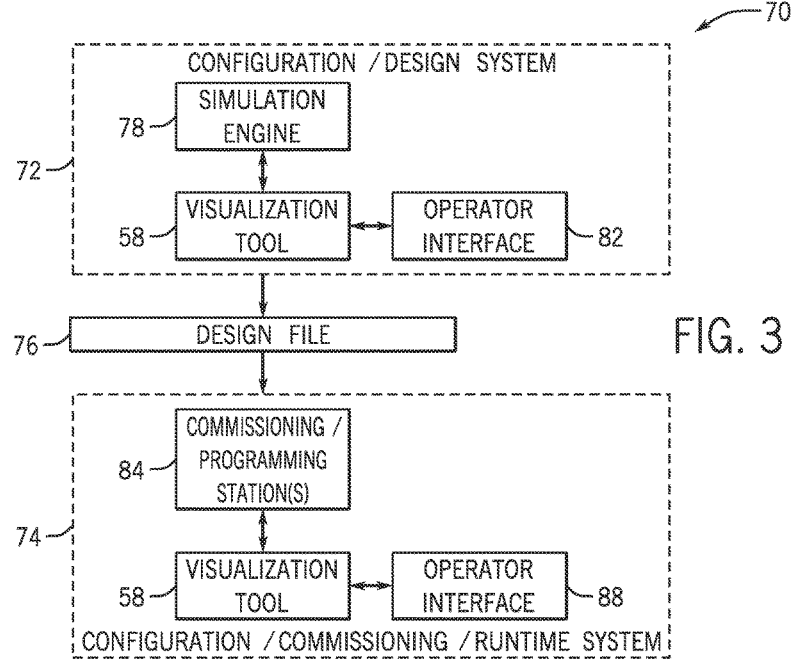
FIG. 3 illustrates an exemplary embodiment of a design file used to integrate a design system with a runtime system.

FIG. 3 is a block diagram illustrating an exemplary embodiment 70 of integrating a design system 72 and a runtime system 74 with the aid of a design file 76. In particular, the block diagram 70 includes two phases, including a design phase implemented by the design system 72, and a commissioning phase implemented by the commissioning/runtime system 74. The design system 72 may be based on designing a layout (e.g., platform or design environment) for representing and optimizing the components of the system 10 as visualization objects 56 with the visualization tool 58. The final design layout may be stored in a design file 76, and may be used to program industrial controls or monitoring components in the commissioning phase with the commissioning/runtime system 72.

Specifically, in the design phase, the design system 72 may be composed of the visualization tool 58 (as described above in FIG. 2), a simulation engine 78, and an operator interface 82. In such embodiments, the operator interface 82 may be a human machine interface, where a human system designer is able to monitor or control various processes of the design system 72. For example, in the design system 72, a human system designer may engage the operator interface 82 to read from or write to specific components of the processor 52. More specifically, as an example, a human system designer may access the memory 53 of the processor 52 to manipulate the data parameters for certain objects generated by the object code 62. Indeed, as a further example, a human system designer may execute the object code 60 of the processor 52 to generate another object each time she wants to represent another system component. As such, the operator interface 82 may be any interface type (e.g., a graphical user interface (GUI), a user interface (UI), a human-machine interface (HMI), man-machine interface (MMI), and so forth) that allows a human system designer to engage with the visualization tool 58 and simulation engine 78 to represent and optimize the industrial system 10.

In certain embodiments of the design phase, the layout designed within the visualization tool 58 as representative of the industrial system 10 may be simulated to operate like the actual industrial system 10 with a simulation engine 78. As described above, the visualization tool 58 builds a platform or design environment in which visualization objects 56 represent the components of the industrial system 10, in accordance with the physical layout of the system 10. In particular, the visualization objects 56 are uniquely characterized with data parameters that correspond to components of the system 10 that the visualization objects 56 represent. The simulation engine 78 simulates the operation of the layout of represented components, such that the components operate with one another as they would within the industrial system 10. For example, the simulation engine 78 may run the layout (i.e., visualization objects 56 particularly arranged and uniquely characterized with data parameters) with 100,000 simulated cans. The simulation may indicate the progress/movement of the simulated cans through the layout, and may also visualize problem areas within the layout (e.g., bottleneck areas, high speed areas, areas with empty cans, and so forth). The simulation allows a human system designer to engage in iterative manipulation of the data parameters of the visualization objects 56 through the operator interface 82, so that the human system designer may yield a set of data parameters for one or more visualization objects 56 which may correspond to optimal utility for one or more system components within the system 10. For example, through this iterative manipulation, a human system designer may optimize the length and width of the aligning conveyor section 17 such that cans on the aligning conveyor section 17 exit one station and enter another station in a steady, uniform stream. The optimized design or configuration of the represented system 10 (i.e., layout optimized by the human system designer with the visualization tool 58) may be stored within the design file 76.

In certain embodiments, during a commissioning phase, a commissioning/runtime system 74 may program industrial controls or monitoring components based upon the stored design file 76. For example, the commissioning phase may occur on-site, and within actual controls or monitoring components of the system 10. The commissioning/runtime system 74 may be composed of one or more commissioning/programming stations 84, the visualization tool 58, and an operator interface 88. The design file 76 may serve as a platform for configuring the commissioning/programming stations 84, and the same design file 76 may be used to commission one or more programming stations 84.

In particular, during the commissioning phase, the commissioning/programming stations 84 may further customize the optimized layout stored in the design file 76 with the visualization tool 58. In certain embodiments, the visualization tool 58 of the commissioning/runtime system 74 may directly communicate with sensors, controllers, monitors 64 (e.g., the sensors 36) of the system 10. Indeed, the visualization tool 58 may also auto-calibrate and optimize utilization of the represented components based on information received from sensors, controller, monitors 64 (e.g., the sensors 36) while the system 10 is in operation. In other embodiments, the human system designer may engage the operator interface 88 to read from or write to specific components of the processor 52. In such embodiments, the operator interface 88 may be used to interface with a controller, machine or process, and may be HMIs, MMIs, GUIs, UIs, operator interfaces (OIs), and so forth.

FIG. 4 is a visualization depicting a simple layout 100 generated by the visualization tool 58 to represent the components of the industrial system 10. As described above, objects are generated by the object code 62 to represent a particular component of the system 10. The objects may be uniquely characterized by the data layer 60 with data parameters to create visualization objects 56. The visualization tool 58 may build the layout 100 (i.e., platform or design environment) to depict an arrangement of the visualization objects 56, such that the arrangement is in accordance with a physical layout of the system 10. As such, the representation of conveyor sections in the simple layout 100 is generally representative of a physical size and orientation of the conveyor sections in the industrial system 10.

In particular, the layout 100 may be free form, so that a user/operator (e.g., a human system designer) can place each visualization object 56 in the desired arrangement. For example, once a visualization object 56 has been characterized with unique data parameters, it may appear at a random location on the layout 100. In certain embodiments, a user/operator (e.g., a human system designer) may simply "click and drag" the visualization object from the random location to a desired location. In this manner, the user/operator is able to arrange the visualization objects 56 in accordance with an existing physical layout of the industrial system 10 or in accordance with a model layout of a potential industrial system. The user/operator may further customize each visualization object 56 to be any geometric shape (i.e., circle, square, rectangle, hexagon, and so forth) or color, so that a user/operator is able to visually distinguish between different types of system components. For example, in the illustrated embodiment, the machine components, such as a filling and sealing station 102, a labeling station 104, or a packaging station 106, are depicted as squares. In addition, the illustrated embodiment depicts exit conveyors 110 and 113, and infeed conveyors 112 and 115, as rectangles. Furthermore, the illustrated embodiment depicts an accumulator conveyor 114 as an "L-shape."

As described above in relation to FIG. 2, each visualization object 56 is uniquely characterized with data parameters by the data layer 60. In certain embodiments, the data parameters may be a performance parameter that may affect the efficient function of components within the system 10. More specifically, the visualization object 56 may be characterized with performance parameters such as speed, dimensions, function, position/arrangement, quantity, and so forth. For example, the exit conveyor 110 may be characterized as having a width of 200 mm and a length of 10,000 mm, while the exit conveyor 113 may be characterized as having a width of 200 mm and a length of 14,000 mm. However, in some embodiments, the visual representation (i.e., the visualization object 56) of the exit conveyor 110 and the exit conveyor 113 may be substantially the same, despite the difference in the characterization of their lengths. In other embodiments, the visualization object 56 may be characterized by a parameter value of interest measured by the sensors 36 such as, for example, rate, pressure, speed, accumulation, density, distance, position/arrangement, quantity, size, and so forth. For example, the exit conveyor 110 may be characterized as moving at a particular rate per minute, such as 50 bottles per minute (BPM) at a particular location on the exit conveyor 110. In such embodiments, the data parameters are set, and/or later automatically modified/updated, with information received by the processor 52 from the sensors, controllers, monitors 64 (e.g., the sensors 36). In some embodiments, a user/operator (e.g., a human system designer, or a controller/machine) may characterize and manipulate the data parameters for each visualization object 56.

Furthermore, the visualization tool 58 may be adapted to include a set of rules for each visualization object 56 representing a conveyor (e.g., the exit conveyors 110 and 113, the infeed conveyors 112 and 115, or the accumulator conveyor 114). The conveyor control rules, which are used by the simulation engine during simulation of the layout 100, assign different priorities for each conveyor depending on the position of the conveyor with respect to other machine components. For example, an exit conveyor 110 or 113 may not accumulate simulated cans as quickly as the accumulator conveyor 114 if the accumulator conveyor 114 has a conveyor rule to prioritize accumulation. The conveyor control rules may be derived from open code, and the operator/user may customize each set of rules for each conveyor so that they are adapted to prioritize a particular function of that conveyor. Each set of conveyor rules may be stored similar to the data parameter values that uniquely characterize each visualization object 56.

FIG. 5 is a visualization of a detailed layout 120 depicted on the operator interface 82 when the simulation engine 78 executes the simple layout 100 of FIG. 4. In certain embodiments, the visualization depicted of the detailed layout 120 may be a moment during the operation of the simulation engine 78 within the design system 72 (i.e., during the design phase). In other embodiments, the visualization depicted of the detailed layout 120 may be a moment during the operation of the system 10 within the commissioning/runtime system 74 (i.e., during the commissioning phase). The detailed layout 120 depicts control functions (i.e., a start function 122, a stop function 124, and a timer 126) that a user/operator may use to control the simulation engine 78.

In particular, the detailed layout 120 includes machine components (i.e., the filling and sealing station 102, the labeling station 104, and the packaging station 106) having the same arrangement as the simple layout 100. Each machine component has an associated display that depicts the rate of bottles per minute (BPM) set by the user/operator, and the rate of bottles per minute currently passing through the particular machine component. For example, the filling and sealing station 102 has a display 130 depicting a set BPM 130*a* of 400 BPM selected by the user/operator, and a current BPM 130*b* depicting the same. However, the labeling station 104 illustrates a display 134 having a set BPM 134*a* of 400 BPM selected by the user/operator, and a current BPM 134*b* of 0 BPM. Furthermore, each machine component has a power display 132 indicating whether it is "ON" or "OFF." As such, while both stations 102 and 104 are "ON," the filling and sealing station 102 is processing bottles at 400 BPM, while the labeling station 104 is not processing any bottles.

In addition, the detailed layout 120 includes a series of conveyor sections (e.g., 146, 148, 150, 162, 164, and 166) positioned between the machine components, where the movement of the simulated cans (i.e., progress of the simulated cans through the detailed layout 120) is indicated with a shaded region 144 (i.e., highlighted region). For example, the presence of simulated cans on conveyor sections 146 and 148 is indicated with the shaded region 144 on portions of the conveyor sections 146 and 148. Similarly, the absence of simulated cans on conveyor sections 150, 162, 164, and 166 is indicated by not shading any region of these sections. Indeed, as further described below in FIG. 7A, the shaded regions 144 of a particular conveyor section are graphical indicia representative of the utilization of that particular conveyor section. Furthermore, each conveyor section is associated with a utilization display that indicates the utilization of the conveyor section in two ways, that is, a numerical utilization based on a predetermined scale, and a normalized utilization based upon a percentage utilized. For example, the utilization display for the conveyor section 146 includes a normalized utilization 146*a* and a numerical utilization 146*b*. The shaded region 144 and the utilization display for each conveyor section may be used in combination to understand the movement of the simulated cans through the detailed layout 120. For example, bottleneck regions, regions of backward accumulation, regions of slow movement, and so forth, can be determined with the shaded region 144, the normalized utilization display, and the numerical utilization display (further described in FIGS. 6-14).

In certain embodiments, the visualization depicted of the detailed layout 120 may be a moment during the operation of the simulation engine 78 within the design system 72 (i.e., during the design phase). In such embodiments, sensors 152 on the simulation engine 78 may indicate the movement of bottles on the conveyor sections 146, 148, 150, 162, 164, and 166 positioned between the machine components. In the illustrated embodiment, the sensors 152 are depicted at the beginning and end of a few conveyor sections, such as at the beginning and end of conveyor section 164 and 166. However, in other embodiments, the sensors 152 may be positioned at other positions on the detailed layout 120, such as at the beginning and end of each conveyor section 146, 148, 150, 162, 164, and 166. The sensors 152 may provide accurate sensor data based at the time of transitioning between two adjacent conveyor sections (e.g., the conveyor section 164 and the conveyor section 166). For example, the sensors 152 may only indicate whether a conveyor section is "full" or "close to full." Therefore, if a sensor 152 indicates that the conveyor section 166 is "not full," the previous conveyor section 164 is allowed to transfer more simulated cans until the sensor 152 indicates the conveyor section 166 is "full." As such, the sensors 152 only provide sensor data for a single transitional moment within the simulation. In other embodiments, a greater quantity of sensors 152 may be positioned along each conveyor section to provide more accurate data on the movement of bottles through the detailed layout 120.

During the operation of the simulation engine 78 within the design system 72, the detected sensor data from the sensors 152 is used to provide the normalized utilization and the numerical utilization for each conveyor section 146, 148, 150, 162, 164, and 166. The numerical utilization may be a scaled number between, for example, 1 bottle and 50 bottles. The numerical utilization may indicate the number of bottles out of 50 that are currently on a particular conveyor section. For example, for the conveyor section 146, the numerical utilization 146b is "30.00," and, as such, 30 bottles on a scale of 1 bottle to 50 bottles are positioned on the conveyor section 146 at the moment the snapshot of the detailed layout 120 was taken during the operation of the simulation engine 78. Furthermore, the numerical utilization 148b of the conveyor section 148 is "19.07," and indicates that nearly 20 bottles are positioned on the conveyor section 148 at the same moment the snapshot was taken. In other embodiments, a user/operator may indicate the scale. In addition, the normalized utilization may be a percentage value of the utilization of each conveyor section 146, 148, 150, 162, 164, and 166. As further described in FIG. 7A, the percentage of utilization is determined and graphically depicted as the percentage of the actual utilization by a known capacitance of each conveyor section.

During the operation of the simulation engine 78 within the design system 72, the detected sensor data from the sensors 152 may be used to auto-calibrate (i.e., adjust or correct) the represented normalized utilization or numerical utilization to match the conditions in the simulation. For example, if the conveyor section 166 is indicated as "full" when the sensors 152 in that region are not active, the utilization of the conveyor section 166 is auto-calibrated (i.e., adjusted) back to a preset fixed value (e.g., to a preset fixed value slightly smaller than 1.0 to indicate that there is no utilization of the conveyor section 166). Similarly, if the conveyor section 166 is indicated as "not full" when the sensors 152 are active, the utilization of the conveyor section 166 is auto-calibrated (i.e., adjusted) to an appropriate fixed value.

In other embodiments, the visualization depicted of the detailed layout 120 may be a moment during the operation of the system 10 within the commissioning/runtime system 74 (i.e., during the commissioning phase). In such embodiments, the sensors 36 (described in FIG. 1) may indicate the movement of bottles on the conveyor sections, such as, for example, on sections 14, 17, and 21. The sensors 36 may be located in various positions within the system 10, and may measure a parameter value of interest relating to the beverage packaging process during the operation of system 10. For example, in certain embodiments, the sensors 36 may include sensors configured to measure the rate of bottles per minute (BPM) entering or leaving a machine component (i.e., stations 13, 16, 20, 22, 24, 26 or 28), or the rate of accumulation of bottles on a portion of a conveyor section (e.g., conveyor section 14, 17, or 21). In general, any sensors 36 capable of measuring a parameter value of interest relating to the beverage packaging process of system 10 (e.g., rate, pressure, speed, accumulation, density, distance, position/arrangement, quantity, size, and so forth) may be used. In some embodiments, the signals relating to the measured parameter values may be used by the visualization tool 58 in the commissioning/runtime system 74 to the normalized utilization and the numerical utilization for each conveyor section of the system 10.

Similar to the operation of the simulation engine 78 within the design system 72, the numerical utilization may be a scaled number between, for example, 1 and 50. The numerical utilization may indicate the number of bottles out of 50 that are currently on a particular conveyor section. In other embodiments, a user/operator may indicate the scale, or an actual approximate of the number of bottles on a particular conveyor section may be provided (e.g., conveyor section 14 has 15,345 bottles at a particular moment). Furthermore, the normalized utilization may be a percentage value of the utilization of each conveyor section 14, 17, or 21. As further described in FIG. 7A, the percentage of utilization is determined and graphically depicted as the percentage of the actual utilization by a known capacitance of each conveyor section.

During the operation of the system 10 within the commissioning/runtime system 74, the detected sensor data from the sensors 36 may be used to auto-calibrate (i.e., adjust or correct) the represented normalized utilization or numerical utilization to match the conditions in the system 10. For example, if sensor data from sensors 36 indicate that the conveyor section 17 is "full," the depicted utilization of the conveyor section 17 is adjusted to a fixed value. Furthermore, if sensor data from sensors 36 indicate that the conveyor section 17 is "not full," the utilization of the conveyor section 17 is auto-calibrated (i.e., adjusted) back to a preset fixed value (e.g., to a preset fixed value slightly smaller than 1.0 to indicate that there is no utilization of the conveyor section 17).

FIGS. 6-11 are exemplary visualizations of a section 170 of the detailed layout 120 depicting backwards accumulation of the simulated cans through the conveyor sections 164, 166, and 168. In the illustrated embodiments, the presence or absence of simulated cans on the conveyor sections 164, 166, and 168 are indicated by the presence of absence of the shaded region 144, respectively. Indeed, as further described below in FIG. 7A, the shaded regions 144 of a particular conveyor section are graphical indicia representative of the utilization of that particular conveyor section. Furthermore, as described above, each conveyor section has an associated utilization display that indicates the utilization of the conveyor section in two ways, that is, a numerical utilization based on a predetermined scale, and a normalized utilization based upon a percentage utilized.

Figure 6:
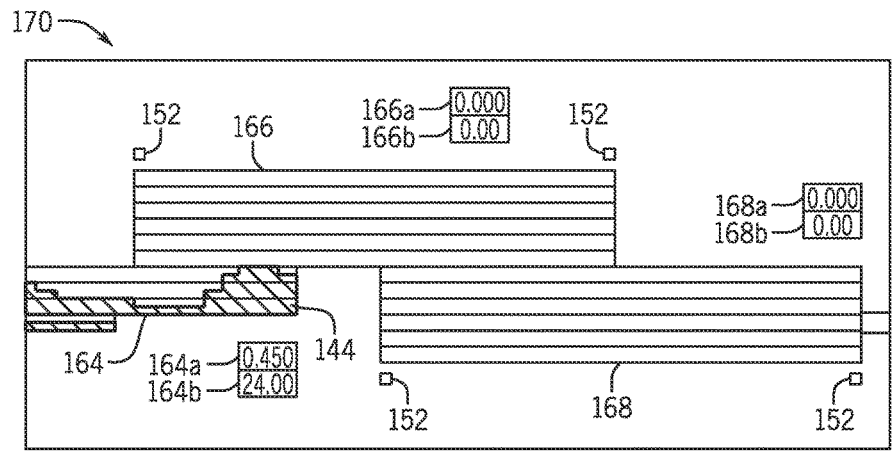
FIG. 6 is a visualization of a section of the detailed layout of FIG. 5, depicting the movement of simulated cans through conveyor sections.

With the foregoing in mind, FIG. 6 is a visualization of the section 170 of the detailed layout 120 depicting the movement of simulated cans into the conveyor section 164. As illustrated, portions of the conveyor section 164 are shaded regions 144, and are graphically representative of the utilization of the conveyor section 164. Furthermore, an associated utilization display for each conveyor section depicts the normalized utilization and a numerical utilization. For example, in the illustrated embodiment, the normalized utilization 164a is "0.450" and indicates that the conveyor section 164 is approximately 45% utilized. Furthermore, the numerical utilization 164b is "24.00," and indicates that on a particular scale (e.g., on a scale between 1 and 100), 24 bottles are positioned on the conveyor section 164. Indeed, as depicted by utilization displays for conveyor sections 166 and 168, the utilization of conveyor sections 166 and 168 are "0.000" because no simulated cans are positioned on these conveyor sections.

Figure 7:
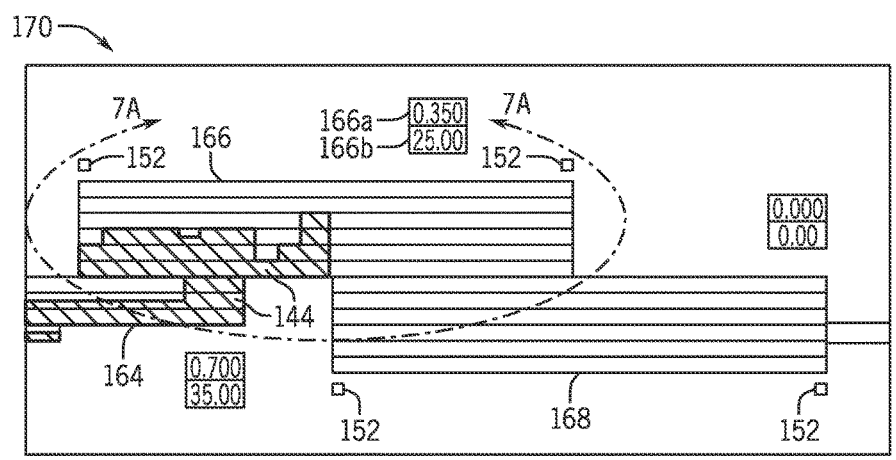
FIG. 7 is a visualization of a section of the detailed layout of FIG. 5, depicting the continued movement of simulated cans through conveyor sections.

FIG. 7 is a visualization of the section 170 of the detailed layout 120 depicting the movement of simulated cans from the conveyor section 164 into the conveyor section 166. As illustrated, portions of the conveyor sections 164 and 166 are shaded regions 144, and are graphically representative of the utilization of the conveyor sections 164 and 166. Furthermore, an associated utilization display for each conveyor section depicts the normalized utilization and a numerical utilization. For example, in the illustrated embodiment, the normalized utilization 164a is "0.700" and indicates that the conveyor section 164 is approximately 70% utilized, and that more simulated cans have filled the conveyor section 164. Furthermore, the numerical utilization 164b is "35.00," and indicates that on a particular scale (e.g., on a scale between 1 and 100), 35 bottles are positioned on the conveyor section 164. In addition, several simulated cans have moved from the conveyor section 164 into the conveyor section 166. As such, in the illustrated embodiment, the normalized utilization 166a is "0.350" and indicates that the conveyor section 166 is approximately 35% utilized. Furthermore, the numerical utilization 166b is "25.00," and indicates that on a particular scale (e.g., on a scale between 1 and 100), 25 bottles are positioned on the conveyor section 166. As depicted by utilization displays for the conveyor section 168, the utilization of the conveyor sections 168 is "0.000" because no simulated cans are positioned on this conveyor section.

Figure 7A:
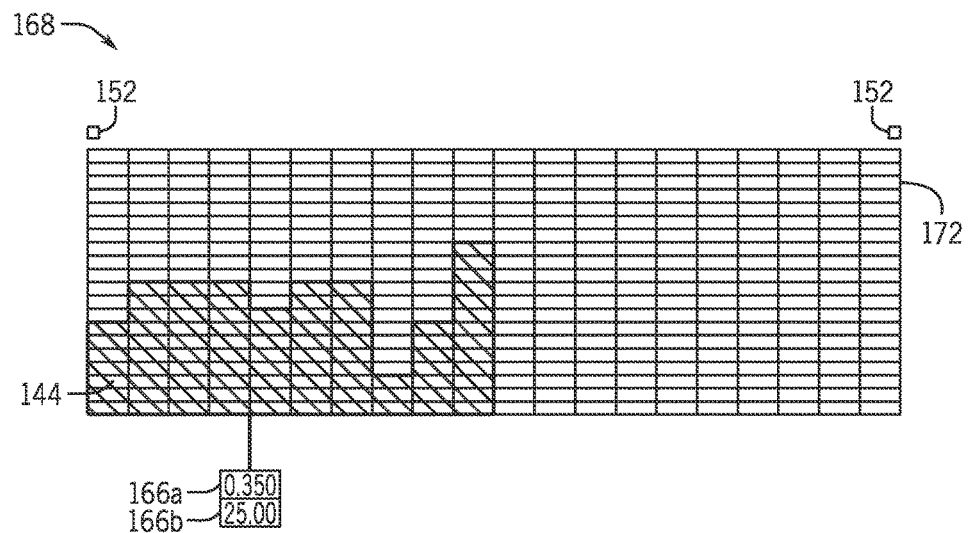
FIG. 7A is a visualization of the conveyor section displaying graphical indicia of the utilization based on received data from sensors.

FIG. 7A is a visualization of the conveyor section 166 displaying graphical indicia of the utilization based on received data from either the sensors 36 or the sensors 152. In some embodiments, the conveyor sections provide a graphical representation of the utilization, such as, for example, graphical indicia comprising the normalized utilization, adjusted based upon received sensor data. In certain embodiments, the conveyor section 166 is subdivided into equal portions 172, and graphical indicia are represented for each of the subdivided equal portions 172. For example, the conveyor section 166 is subdivided into 20 rows of equal portions 172 and the shaded region 144 depicts the utilization of each subdivided equal portion 172. In particular, the normalized utilization of the conveyor section 166 may be indicated as the percentage of utilization, and may be determined and graphically depicted as the percentage of the actual utilization by a known capacity of each of the equal portions 172.

Figure 8:
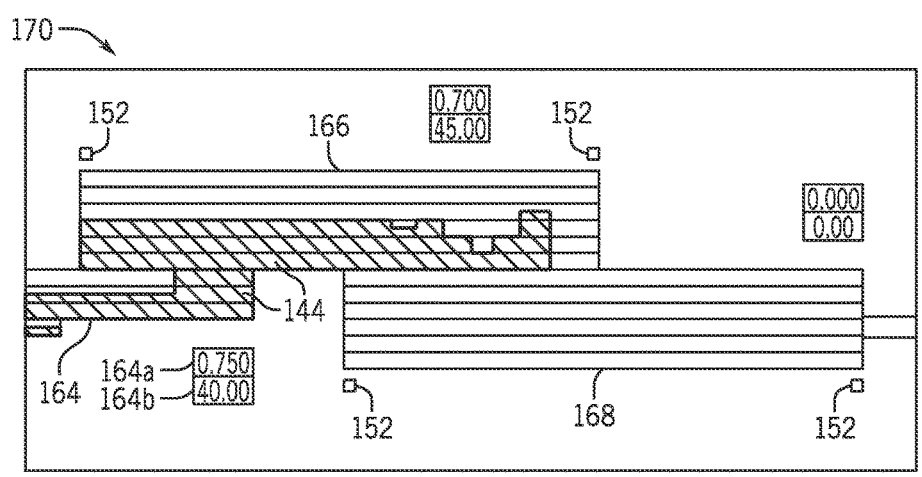
FIGS. 8-11 are visualizations of a section of the detailed layout of FIG. 5, depicting the continued movement of simulated cans through conveyor sections.

FIG. 8 is a visualization of the section 170 of the detailed layout 120 depicting the continued movement of simulated cans from the conveyor section 164 into the conveyor section 166. As illustrated, portions of the conveyor sections 164 and 166 are shaded regions 144, and are graphically representative of the utilization of the conveyor sections 164 and 166. Furthermore, an associated utilization display for each conveyor section depicts the normalized utilization and a numerical utilization. For example, in the illustrated embodiment, the normalized utilization 164a is "0.750" and indicates that the conveyor section 164 is approximately 75% utilized, and that more simulated cans have filled the conveyor section 164. Furthermore, the numerical utilization 164b is "40.00," and indicates that on a particular scale (e.g., on a scale between 1 and 100), 40 bottles are positioned on the conveyor section 164. In addition, more simulated cans have moved from the conveyor section 164 into the conveyor section 166. As such, in the illustrated embodiment, the normalized utilization 166a is "0.700" and indicates that the conveyor section 166 is approximately 70% utilized. Furthermore, the numerical utilization 166b is "45.00," and indicates that on a particular scale (e.g., on a scale between 1 and 100), 45 bottles are positioned on the conveyor section 166. Indeed, the utilization displays indicate that more simulated bottles have moved from the conveyor section 164 into the conveyor section 166. As depicted by utilization displays for the conveyor section 168, the utilization of the conveyor sections 168 is "0.000" because no simulated cans are positioned on this conveyor section.

Figure 9:
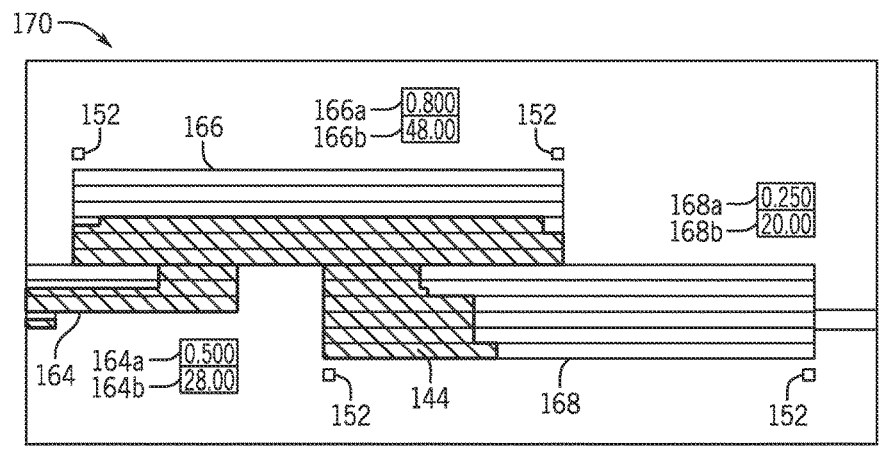

FIG. 9 is a visualization of the section 170 of the detailed layout 120 depicting the movement of simulated cans from the conveyor section 166 into the conveyor section 168. As illustrated, portions of the conveyor sections 164, 166, and 168 are shaded regions 144, and are graphically representative of the utilization of the conveyor sections 164, 166, and 168. Furthermore, an associated utilization display for each conveyor section depicts the normalized utilization and a numerical utilization. For example, in the illustrated embodiment, the normalized utilization 164a is "0.500" and indicates that the conveyor section 164 is approximately 50% utilized, and that simulated cans have started to leave the conveyor section 164. Furthermore, the numerical utilization 164b is "28.00," and indicates that on a particular scale (e.g., on a scale between 1 and 100), 28 bottles are positioned on the conveyor section 164. Again, the numerical utilization 164b indicates a decrease in the number of bottles on conveyor section 164. In addition, more simulated cans have moved from the conveyor section 166 into the conveyor section 168. As such, in the illustrated embodiment, the normalized utilization 166a is "0.800" and indicates that the conveyor section 166 is approximately 80% utilized. Furthermore, the numerical utilization 166b is "48.00," and indicates that on a particular scale (e.g., on a scale between 1 and 100), 48 bottles are positioned on the conveyor section 166. Furthermore, the utilization displays indicate that more simulated bottles have moved from the conveyor section 166 into the conveyor section 168. For example, in the illustrated embodiment, the normalized utilization 168a is "0.250" and indicates that the conveyor section 168 is approximately 25% utilized. Furthermore, the numerical utilization 168b is "20.00," and indicates that on a particular scale (e.g., on a scale between 1 and 100), 20 bottles are positioned on the conveyor section 168. As such, as the simulated bottles have left the conveyor section 164, they have begun to accumulate in the conveyor section 168.

Figure 10:
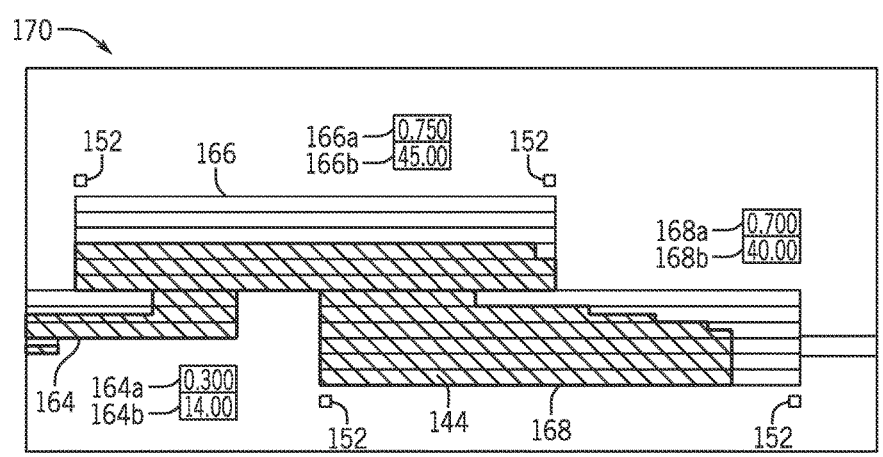

FIG. 10 is a visualization of the section 170 of the detailed layout 120 depicting the continued movement of simulated cans from the conveyor section 166 into the conveyor section 168. As illustrated, portions of the conveyor sections 164, 166, and 168 are shaded regions 144, and are graphically representative of the utilization of the conveyor sections 164, 166, and 168. Furthermore, an associated utilization display for each conveyor section depicts the normalized utilization and a numerical utilization. For example, in the illustrated embodiment, the normalized utilization 164a is "0.300" and indicates that the conveyor section 164 is approximately 30% utilized, and that simulated cans have continued to leave the conveyor section 164. Furthermore, the numerical utilization 164b is "14.00," and indicates that on a particular scale (e.g., on a scale between 1 and 100), 14 bottles are positioned on the conveyor section 164. Again, the numerical utilization 164b indicates a decrease in the number of bottles on conveyor section 164. In addition, more simulated cans have moved from the conveyor section 166 into the conveyor section 168. As such, in the illustrated embodiment, the normalized utilization 166a is "0.750" and indicates that the conveyor section 166 is approximately 75% utilized. Furthermore, the numerical utilization 166b is "45.00," and indicates that on a particular scale (e.g., on a scale between 1 and 100), 45 bottles are positioned on the conveyor section 166. Furthermore, the utilization displays indicate that more simulated bottles have moved from the conveyor section 166 into the conveyor section 168. For example, in the illustrated embodiment, the normalized utilization 168a is "0.700" and indicates that the conveyor section 168 is approximately 25% utilized. Furthermore, the numerical utilization 168b is "40.00," and indicates that on a particular scale (e.g., on a scale between 1 and 100), 40 bottles are positioned on the conveyor section 168. As such, as the simulated bottles have left the conveyor section 164, they have begun to accumulate in the conveyor section 168.

Figure 11:
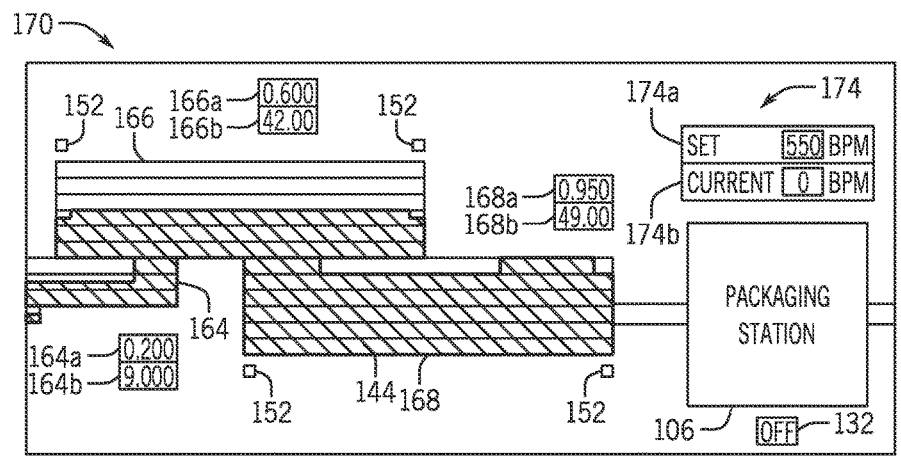

FIG. 11 is a visualization of the section 170 of the detailed layout 120 depicting the backwards accumulation of the simulated cans through the conveyor sections 164, 166, and 168. As illustrated, portions of the conveyor sections 164, 166, and 168 are shaded regions 144, and are graphically representative of the utilization of the conveyor sections 164, 166, and 168. Furthermore, an associated utilization display for each conveyor section depicts the normalized utilization and a numerical utilization. In the illustrated embodiment, the packaging station 106 is in an "OFF" position, as indicated by the power switch 132. In addition, the display 174 for the packaging station 106 indicates that while the set BPM 174a is "550 BPM," the current BPM 174b is actually "0 BPM." As such, the packaging station 106 is not processing any simulated cans, and the simulated cans begin to accumulate on conveyor sections 164, 166, and 168.

For example, in the illustrated embodiment, the normalized utilization 164a is "0.200" and indicates that the conveyor section 164 is approximately 20% utilized, and that simulated cans have continued to leave the conveyor section 164. Furthermore, the numerical utilization 164b is "9.00," and indicates that on a particular scale (e.g., on a scale between 1 and 100), 9 bottles are positioned on the conveyor section 164. Again, the numerical utilization 164b indicates a decrease in the number of bottles on conveyor section 164. In addition, more simulated cans have moved from the conveyor section 166 into the conveyor section 168. As such, in the illustrated embodiment, the normalized utilization 166a is "0.600" and indicates that the conveyor section 166 is approximately 60% utilized. Furthermore, the numerical utilization 166b is "42.00," and indicates that on a particular scale (e.g., on a scale between 1 and 100), 42 bottles are positioned on the conveyor section 166. Furthermore, the utilization displays indicate that more simulated bottles have moved from the conveyor section 166 into the conveyor section 168. For example, in the illustrated embodiment, the normalized utilization 168a is "0.950" and indicates that the conveyor section 168 is approximately 95% utilized. Furthermore, the numerical utilization 168b is "49.00," and indicates that on a particular scale (e.g., on a scale between 1 and 100), 49 bottles are positioned on the conveyor section 168. As such, as the simulated bottles have left the conveyor section 164, they have begun to accumulate in the conveyor section 168.

Figure 12:
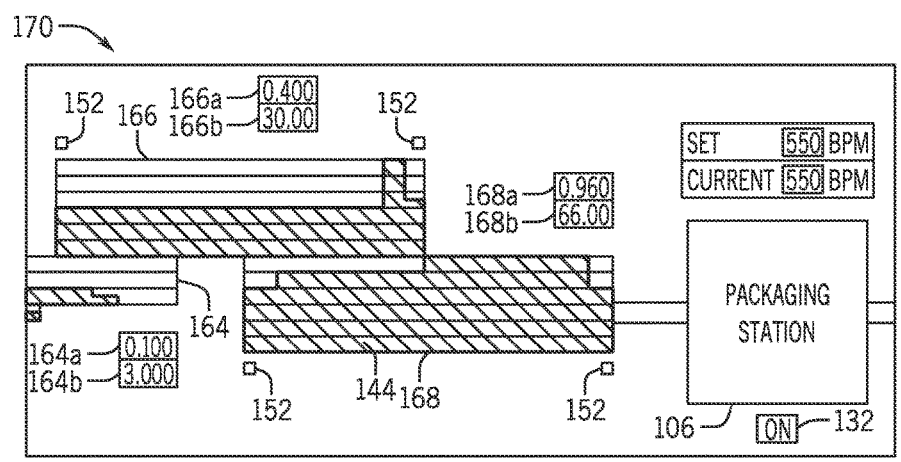
FIGS. 12-13 is a visualization of a section of the detailed layout of FIG. 5, depicting continued processing of the simulated cans through the conveyor sections and through a packaging station.
Figure 13:
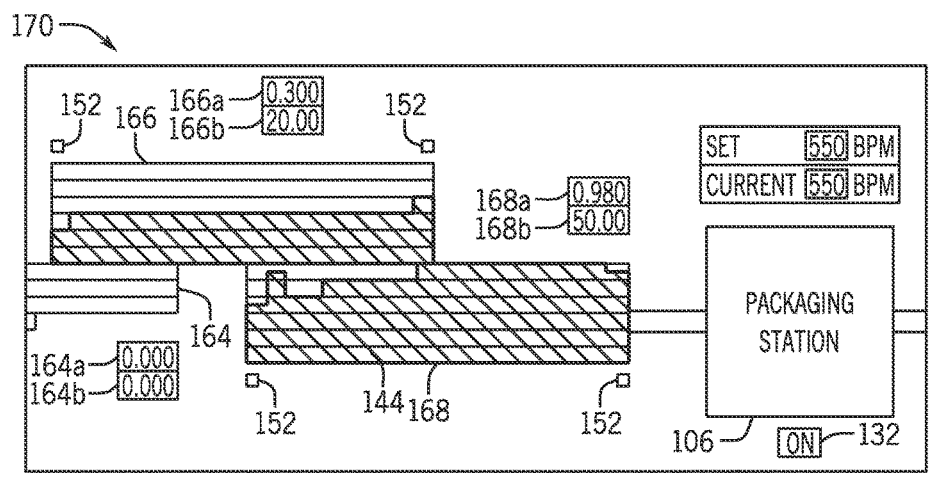

FIGS. 12-13 are visualizations of a section 170 of the detailed layout 120 depicting continued processing of the simulated cans through the conveyor sections 164, 166, and 168 and through the packaging station 106. FIGS. 12-13 depict the conveyor sections 164, 166, and 168 with shaded regions 144, and displays graphically representatives of the utilization of the conveyor sections 164, 166, and 168. In the illustrated embodiments, the packaging station 106 is in an "ON" position, as indicated by the power switch 132. In addition, the display 174 for the packaging station 106 indicates that the set BPM 174a is "550 BPM," and the current BPM 174b is also "550 BPM." As such, the packaging station 106 is processing simulated cans, and the simulated cans, which have previously began to accumulate on conveyor sections 164, 166, and 168, have continued to be processed through the packing station 106.

With the forgoing in mind, in FIG. 12 is a visualization of the section 170 of the detailed layout 120 depicting the processing of the simulated cans through the conveyor sections 164, 166, and 168 and through the packaging station 106. In the illustrated embodiment, the normalized utilization 164a is "0.100" and indicates that the conveyor section 164 is approximately 10% utilized, and that simulated cans have continued to leave the conveyor section 164. Furthermore, the numerical utilization 164b is "3.00," and indicates that on a particular scale (e.g., on a scale between 1 and 100), 3 bottles are positioned on the conveyor section 164. Again, the numerical utilization 164b indicates a decrease in the number of bottles on conveyor section 164. In addition, more simulated cans have moved from the conveyor section 166 into the conveyor section 168. As such, in the illustrated embodiment, the normalized utilization 166a is "0.400" and indicates that the conveyor section 166 is approximately 40% utilized. Furthermore, the numerical utilization 166b is "30.00," and indicates that on a particular scale (e.g., on a scale between 1 and 100), 30 bottles are positioned on the conveyor section 166. Furthermore, the utilization displays indicate that more simulated bottles have moved from the conveyor section 166 into the conveyor section 168. For example, in the illustrated embodiment, the normalized utilization 168a is "0.960" and indicates that the conveyor section 168 is approximately 96% utilized. Furthermore, the numerical utilization 168b is "66.00," and indicates that on a particular scale (e.g., on a scale between 1 and 100), 66 bottles are positioned on the conveyor section 168. As such, as the simulated bottles have nearly left the conveyor section 164, they have begun to leave the conveyor section 166, and more simulated bottles have begun to be processed through the packaging station 106 via the conveyor section 168.

FIG. 13 is a visualization of the section 170 of the detailed layout 120 depicting the continued processing of the simulated cans through the conveyor sections 164, 166, and 168 and through the packaging station 106. In the illustrated embodiment, the normalized utilization 164a is "0.000" and indicates that the conveyor section 164 is approximately 0% utilized, and that simulated cans have left the conveyor section 164. Furthermore, the numerical utilization 164b is "0.00," and once again indicates that the simulated cans have left the conveyor section 164. In addition, all the simulated cans have moved from the conveyor section 166 into the conveyor section 168. As such, in the illustrated embodiment, the normalized utilization 166a is "0.300" and indicates that the conveyor section 166 is approximately 30% utilized. Furthermore, the numerical utilization 166b is "20.00," and indicates that on a particular scale (e.g., on a scale between 1 and 100), 20 bottles are positioned on the conveyor section 166. Furthermore, the utilization displays indicate that more simulated bottles have been processed by the packaging station 106, and have moved from the conveyor section 166 into the conveyor section 168. For example, in the illustrated embodiment, the normalized utilization 168a is "0.980" and indicates that the conveyor section 168 is approximately 98% utilized. Furthermore, the numerical utilization 168b is "50.00," and indicates that on a particular scale (e.g., on a scale between 1 and 100), 50 bottles are positioned on the conveyor section 168. As such, as the simulated bottles have left the conveyor section 164, they have begun to leave the conveyor section 166, and more simulated bottles have begun to be processed through the packaging station 106 via the conveyor section 168.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
    displaying, via a processor, a plurality of visualizations representing a plurality of machine components of an industrial system on a display device;
    displaying, via the processor, at least one visualization representing at least one conveyor section disposed between a portion of the plurality of machine components on the display device, wherein the at least one visualization comprises one or more segments of the at least one conveyor section that correspond to one or more locations along the at least one conveyor section, and wherein the one or more segments are configured to represent a load on the at least one conveyor section at the one or more locations;
    determining, via the processor, an expected utilization of the at least one conveyor section over a period of time;
    generating at least one modified visualization based on the at least one visualization and the expected utilization of the at least one conveyor section over the period of time;
    receiving, via the processor, data indicative of an actual utilization of the at least one conveyor section during operation of the industrial system, wherein the data is received from at least one sensor configured to monitor the actual utilization of the at least one conveyor section, and wherein the actual utilization comprises a percentage of available capacity of the at least one conveyor section;
    modifying, via the processor, the at least one modified visualization based on the actual utilization of the at least one conveyor section, wherein the at least one modified visualization comprises a shading depicted on the one or more segments, wherein an amount of the shading of the one or more segments represents at least the percentage of available capacity of the at least one conveyor section at a respective location of the one or more locations; and
    adjusting an operation of the at least one conveyor section based on the actual utilization of the at least one conveyor section.

2. The method of claim 1, wherein the plurality of visualizations representing the plurality of machine components are oriented in accordance with a physical layout of the industrial system.

3. The method of claim 1, wherein each of the one or more segments depicted in the at least one visualization is generally representative of a physical size and orientation of the at least one conveyor section in the industrial system.

4. The method of claim 1, comprising displaying, via the processor, graphical indicia indicative of the actual utilization of the at least one conveyor section.

5. The method of claim 4, wherein the at least one modified visualization is modified by highlighting the one or more segments based on the actual utilization.

6. The method of claim 4, comprising representing an actual utilization for each segment of the one or more segments.

7. The method of claim 6, wherein each of the one or more segments comprises an equal size.

8. The method of claim 4, wherein the graphical indicia comprise a number of manufactured articles at locations along the at least one conveyor section.

9. The method of claim 1, comprising normalizing, via the processor, the actual utilization, and displaying graphical indicia comprising a representation of the normalized utilization.

10. The method of claim 1, wherein the method is performed during operation of the industrial system.

11. The method of claim 1, wherein the data is sensor data generated during operation of the industrial system, and wherein the at least one modified visualization is modified based upon the sensor data.

12. An industrial system visualization method, comprising:
    executing computer code via a processor to:
        display a plurality of visualizations representing a plurality of machine components of an industrial system on a display device;
        display at least one visualization representing at least one conveyor section disposed between a portion of the plurality of machine components on the display device, wherein the at least one visualization comprises a plurality of segments that correspond to a plurality of locations along the at least one conveyor section, and wherein each of the plurality of segments represents a respective load at the plurality of locations;
        determine an expected utilization of the at least one conveyor section over a period of time;
        generate at least one modified visualization based on the at least one visualization and the expected utilization of the at least one conveyor section over the period of time;
        receive data indicative of an actual utilization of the at least one conveyor section during operation of the industrial system, wherein the data is received from at least one sensor configured to monitor the actual utilization of the at least one conveyor section, and wherein the actual utilization comprises a percentage of available capacity of the at least one conveyor section;
        normalize the data based upon a known capacity of the at least one conveyor section;
        modify the at least one modified visualization based on the actual utilization of the at least one conveyor section, wherein the at least one modified visualization comprises a shading depicted on at least one of the plurality of segments, wherein the shading is a representation of at least the percentage of available capacity of a respective location of the plurality of locations; and
        adjusting an operation of the at least one conveyor section based on the actual utilization of the at least one conveyor section.

13. The method of claim 12, wherein the at least one modified visualization is modified by highlighting the at least one of the plurality of segments based on the actual utilization.

14. The method of claim 13, comprising representing an actual utilization for each segment of the plurality of segments via a graphical indicator.

15. The method of claim 14, wherein each of the plurality of segments is equally sized.

16. An industrial system visualization method, comprising:
executing computer code via a processor to:
display a plurality of visualizations representing a plurality of machine components of an industrial system on a display device;
display at least one visualization representing a conveyor section disposed between at least two of the plurality of machine components on the display device, wherein the at least one visualization comprises one or more segments of the conveyor section that correspond to one or more locations along the conveyor section, and wherein the one or more segments are configured to represent a load on the conveyor section at the one or more locations;
receive data indicative of an actual utilization of the conveyor section over a first period of time, wherein the received data is sensor data generated by one or more sensors during operation of the industrial system, and wherein the actual utilization comprises a percentage of available capacity of the conveyor section;
generate at least one modified visualization based on the at least one visualization and the actual utilization of the conveyor section over the first period of time, wherein the at least one modified visualization comprises a shading depicted on the one or more segments, wherein an amount of the shading of the one or more segments represents at least the percentage of available capacity of the conveyor section at a respective location of the one or more locations;
generate at least one simulated visualization based on an expected utilization of the conveyor section over a second period of time and the actual utilization; and
display the at least one simulated visualization on the display device; and
adjust an operation of the conveyor section based on the actual utilization of the conveyor section.

17. The method of claim 16, comprising normalizing the data based upon a known capacity of the conveyor section, and wherein the at least one simulated visualization is generated based on the normalized utilization.

18. The method of claim 16, wherein the at least one modified visualization is generated by highlighting the one or more segments based on the actual utilization.

19. The method of claim 18, comprising representing an actual utilization for each segment of the one or more segments.

20. The method of claim 19, wherein each of the one or more segments comprises an equal size.

21. An industrial system visualization method, comprising: during a design phase, executing computer code via a processor to:
display a plurality of visualizations comprising a plurality of objects representing at least two machine components of an industrial system on a display device;
display at least one visualization representing a utilization of a conveyor section disposed between the at least two machine components on the display device, wherein the at least one visualization comprises a plurality of segments that correspond to a plurality of locations along the conveyor section, and wherein each of the plurality of segments represents a respective load at the plurality of locations; and
store a configuration file based on the at least one visualization and the data; and
during a commissioning phase, executing computer code via the processor to:
receive data representative of an actual utilization of the conveyor section from one or more sensors during operation of the industrial system, wherein the actual utilization comprises a percentage of available capacity of the conveyor section;
update the at least one visualization based on the actual utilization and the stored configuration file, wherein the at least one updated visualization comprises a shading depicted on at least one of the plurality of segments, wherein the shading is a representation of at least the percentage of available capacity of a respective location of the plurality of locations; and
adjust an operation of the conveyor section based on the actual utilization of the conveyor section.

22. The method of claim 21, wherein the at least one updated visualization is displayed via a human machine interface.

23. An industrial system visualization method, comprising:
receiving a stored file created during a design phase comprising computer code representing a plurality of machine components of an industrial system and at least one conveyor section between the plurality of machine components; and
during a commissioning phase, programming an industrial control or monitoring component based upon the stored file to:
display representations of the plurality of machine components and the conveyor section on a display device, wherein the representation of the conveyer section comprises a plurality of segments that correspond to a plurality of locations along the conveyor section, and wherein the plurality of segments represents a load at the plurality of locations;
receive data representative of utilization of the conveyor section from one or more sensors during operation of the industrial system, wherein the utilization comprises a percentage of available capacity of the conveyor section; and
display updated representations of the utilization of the conveyor section based on the data, wherein the updated representations comprise a shading depicted on at least one of the plurality of segments, wherein the shading is a representation of at least the percentage of available capacity of a respective location of the plurality of locations; and
adjust an operation of the conveyor section based on the utilization of the conveyor section.

* * * * *